United States Patent
Cole et al.

(10) Patent No.: US 10,865,919 B2
(45) Date of Patent: Dec. 15, 2020

(54) TERMINATION FOR SHEATHED TUBING WITH LEAK CONTAINMENT AND DETECTION PROVISIONS

(71) Applicant: Ward Manufacturing LLC, Blossburg, PA (US)

(72) Inventors: Grant C. Cole, Wellsboro, PA (US); Timothy C. Murray, Jr., Covington, PA (US)

(73) Assignee: WARD MANUFACTURING LLC, Blossburg, PA (US)

( * ) Notice: Subject to any disclaimer, the term of this patent is extended or adjusted under 35 U.S.C. 154(b) by 406 days.

(21) Appl. No.: 15/882,340

(22) Filed: Jan. 29, 2018

(65) Prior Publication Data
US 2018/0224032 A1   Aug. 9, 2018

Related U.S. Application Data

(60) Provisional application No. 62/455,033, filed on Feb. 6, 2017.

(51) Int. Cl.
*F16L 25/00* (2006.01)
*F16L 39/02* (2006.01)

(52) U.S. Cl.
CPC ........... *F16L 25/0036* (2013.01); *F16L 39/02* (2013.01); *F16L 2201/30* (2013.01)

(58) Field of Classification Search
CPC .... F16L 25/0036; F16L 39/02; F16L 2201/30
USPC ....................................................... 285/903
See application file for complete search history.

(56) References Cited

U.S. PATENT DOCUMENTS

| | | | |
|---|---|---|---|
| 4,674,775 A * | 6/1987 | Tajima | F16L 25/0036 285/903 |
| 6,877,781 B2 | 4/2005 | Edler | |
| 7,004,510 B2 | 2/2006 | Treichel | |
| 7,055,868 B2 | 6/2006 | Watanabe | |
| 2009/0066083 A1 | 3/2009 | Rolland et al. | |
| 2010/0117358 A1* | 5/2010 | Treichel | F16L 25/0036 |
| 2012/0049509 A1* | 3/2012 | Lininger | F16L 25/0036 |
| 2012/0261915 A1* | 10/2012 | Zerrer | F16L 25/0036 |
| 2014/0306448 A1 | 10/2014 | Rivest | |
| 2015/0316187 A1* | 11/2015 | Matsubara | F16L 25/0036 |
| 2018/0038533 A1* | 2/2018 | Ibayashi | |

* cited by examiner

*Primary Examiner* — Zachary T Dragicevich
(74) *Attorney, Agent, or Firm* — Duane Morris LLP

(57) ABSTRACT

A fitting for an end of a length of corrugated tubing with an outer sheath includes an engagement ring for gripping the tubing adjacent to an endmost corrugation of the tubing to preclude axial displacement of the retainer on the tubing. The fitting also includes an end plug having at least one threaded surface and a hollow cylindrical part sized to admit and engage with the engagement ring. The end fitting also includes a nut having a threaded portion complementary with the threaded surface of the end plug and an inner surface that defines an inner cavity. An annular groove extends from the inner surface. A vent extends through the sidewall and is disposed between the threaded surface and the groove. A gasket is disposed in the annular groove and a portion of the gasket extends into the inner cavity and is configured to sealingly engage the sheath.

14 Claims, 4 Drawing Sheets

TERMINATION FOR SHEATHED TUBING WITH LEAK CONTAINMENT AND DETECTION PROVISIONS

CROSS-REFERENCE TO RELATED APPLICATIONS

This application claims priority to U.S. Provisional Application No. 62/455,033, filed Feb. 6, 2017, the entirety of which is incorporated by reference herein.

FIELD

This disclosure concerns fittings for making hermetically sealed connections with sheathed tubing, such as natural gas and propane conduits connecting with appliances and the like, typically having corrugated stainless steel tubing that is sheathed within a plastic outer tube and terminates at a brass end fitting.

BACKGROUND

Plastic-sheathed corrugated stainless steel tubing or conduits ("CSST") are in wide use, for example to make connections along flow paths between gas meters and fuel consuming appliances. The corrugated stainless steel is durable and flexible, permitting an appliance to vibrate or move to some extent relative to a fixed wall pipe or the like, with minimal risk of leakage due to metal fatigue caused by repeated bending of the CSST. The plastic sheathing protects the CSST and can be made electrically conductive and/or fire resistant.

Termination fittings can be provided at both CSST ends. These can be endwise terminations, such as at the appliance, or in-line couplings between tubing lengths or between a length of tubing and a fixed pipe. In either case, the termination fitting comprises a connection structure such as a threaded nut or nipple with an in-line passage or lumen through which gas or liquid flows. These fittings are advantageously made of brass. The termination fitting on the tubing cooperates with a complementary fitting on the appliance or pipe or other tubing end, to define a continuous flow path. Threads on the termination fittings are structured and are tightened during installation sufficiently to ostensibly prevent leakage of gas or liquid into the surrounding air from between the termination fittings. The termination fittings can have internal clamping structures that are also tightened to engage with a cut end of the corrugated stainless steel tubing from which the plastic sheathing has been stripped, so as to confine the gas or liquid against leakage between the CSST and the termination fitting. Examples of clamping fittings are disclosed, for example, in U.S. Pat. Nos. 7,055,868, 6,877,781, which are hereby incorporated by reference.

There is a potential leakage flow path between the corrugated tubing and the plastic sheathing. Containments that seek to establish a gas tight envelope around the junction between CSST and a termination fitting are known, for example, as disclosed in U.S. Pat. No. 7,004,510, and published applications US 2014/0306448, and US 2009/0066083, which are also incorporated by reference. The object is to provide some sort of external housing that encloses around the junction, including a passageway that either vents any leakage to a safe place or operates an alarm device. These are of varying complexity and may have a series of telescopically connected cylindrical parts, one of which has a generally radial opening as the vent.

Terminations of lengths of tubing for liquid or gas usually involve a brass or other metal terminating element that often has a thread for mating with a further threaded element on one longitudinal end of the terminating element to form a sealed flow path. On the other longitudinal end of the terminating element, namely the end facing toward the tubing, the terminating element has a structure that engages with and hermetically seals with the tubing, such as a length of flexible tubing. In this context, the word "termination" applies to a terminal junction such as an appliance or the like at the end of a flow path, or to an intermediate junction at which successive lengths of tubing are joined to extend a linear flow path, or to junctions that form a fork or tee, etc. All such junctions that entail a fitting with a terminating element for at least a section of tubing can be deemed terminations, termination fittings, or terminal fittings, at least with respect to their associated section of tubing. At the junction between the termination fitting and the tubing, it is desirable to have mechanical support aligning the tubing with the fitting approaching the junction, as well as a sealing structure to obtain a sure and long lasting hermetic seal against leakage. Potential vibration, tension, impact or other effects, particularly over a period of time, may deteriorate the quality of the mechanical connection and the seal between the corrugated stainless steel tubing and the termination fitting.

CSST is usually not used for stationary tubing lengths, for example underground, because there is no issue with movement or vibration and a steel pipe will suffice. However, flexible tubing may be advantageous underground in certain circumstances, such as to simplify coupling between pipe sections that are not precisely aligned because the CSST can follow a curve. When it becomes desirable to use corrugated stainless steel tubing underground, especially to carry flammable gas, certain precautions are advantageously taken, such as precautions to provide for proper venting to the free air if an underground portion were to generate a leak, and thus to prevent a potentially dangerous accumulation of flammable gas.

SUMMARY

In one embodiment, a fitting for an end of a length of corrugated tubing with an outer sheath includes an engagement ring for gripping the tubing adjacent to an endmost corrugation of the tubing to preclude axial displacement of the retainer on the tubing. The fitting also includes an end plug having at least one threaded surface and a hollow cylindrical part sized to admit and engage with the engagement ring. The end fitting also includes a nut having a threaded portion complementary with the threaded surface of the end plug and an inner surface that defines an inner cavity. An annular groove extends from the inner surface. A vent extends through the sidewall and is disposed between the threaded surface and the groove. A gasket is disposed in the annular groove and a portion of the gasket extends into the inner cavity and is configured to sealingly engage the sheath.

In another embodiment, a fitting-tubing assembly includes tubing having peaks and valleys and an outer sheath and a fitting secured to the tubing. The fitting includes an engagement ring for gripping the tubing adjacent to an endmost corrugation of the tubing to preclude axial displacement of the retainer on the tubing. The fitting also includes an end plug having at least one threaded surface and a hollow cylindrical part sized to admit and engage with the engagement ring. The end fitting also includes a nut having a threaded portion complementary with the threaded surface of the end plug and an inner surface that defines an inner cavity. An annular groove extends from the inner surface. A vent extends through the sidewall and is disposed between the threaded surface and the groove. A gasket is disposed in the annular groove and a portion of the gasket extends into the inner cavity and is configured to sealingly engage the sheath.

In another embodiment, a method of terminating a length of corrugated tubing with an outer sheath includes the step of cutting the tubing, thereby forming an endmost corrugation. The method also includes the step of cutting the sheath, thereby exposing a portion of the tubing. The method also includes inserting the tubing into an engagement ring having a ridge placed axially adjacent to the endmost corrugation of the tubing. The method also includes engaging a threaded portion of a nut with a threaded surface of an end plug to cause the ridge to securely grip the tubing. The nut has a sidewall with an inner surface defining an inner cavity and an annular groove extending from the inner surface. The nut also includes a vent extending through the sidewall and disposed between the threaded surface and the annular groove. A gasket is disposed in the annular groove such that a portion of the gasket extends into the inner cavity and sealingly engages the sheath.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
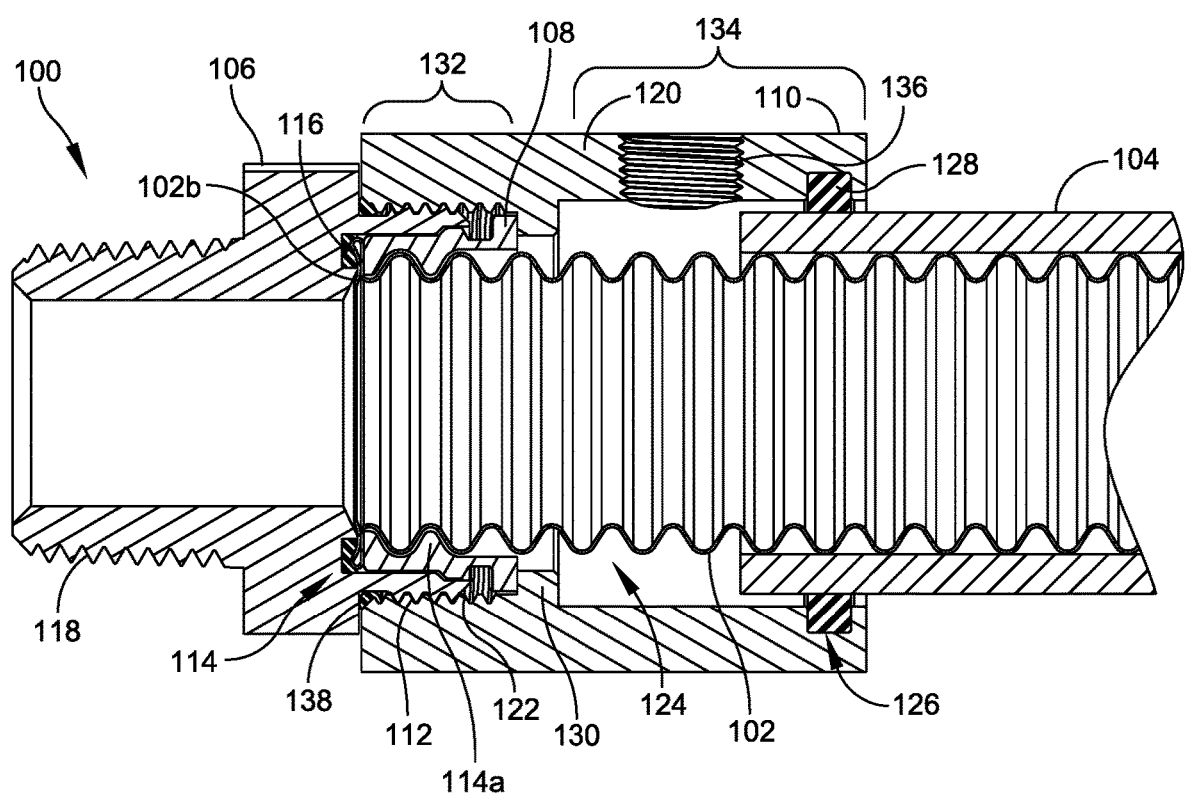
FIG. 1 is a section view showing a fitting, tubing, and sheath according to one embodiment of the present disclosure.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The fittings described herein provide for confinement of contents leaking from CSST using a simple arrangement. A nut of the termination fitting includes a cylindrical skirt part that is elongated back from the termination, over a proximal part of the tubing approaching a termination. The cylindrical skirt encloses over a portion of a sheath enveloping the tubing. The nut is preferably part of a clamping structure. One or more gaskets such as O-ring are provided within the cylindrical skirt part, preferably captive in an annular groove inside the skirt part, and is compressed between the outer surface of the sheath and the inner surface of the cylindrical skirt part. A vent opening can be provided in the skirt part for detecting or dissipating gas leaking along a flow path between the CSST and the sheath, from some indefinite point at which the CSST may have been damaged or breached.

In FIG. 1 a tubing termination fitting 100 is shown attached to a distal end 102b of a section of tubing 102, for example corrugated stainless steel tubing. A sheath 104 envelops a portion of the tubing 102. In some embodiments, the sheath 104 completely envelops the tubing 102 between two fittings. The sheath 104 has been stripped from a portion 102a of the tubing 102 near the distal end 102b of the tubing 102. This allows engagement with a portion of the fitting 100, as will be described further herein.

The tubing 102 has corrugations, namely spatially periodic regular variations in diameter forming successive ridges and valleys around the axis of the tube, ranging between a maximum diameter and a minimum diameter. The corrugations proceed along the longitudinal (axial) extension of the tubing 102. Tubing 102 may be cut from a longer length using a hand tool such as a hardened wheel tubing cutter or a hacksaw, for example. A power tool such as a radial arm or pivoting chop saw can be used. The tubing end is advantageously cut off square (i.e., on a plane normal to the longitudinal axis of the tubing 102).

The sheath 104 can be formed of any appropriate material that can provide secondary containment of gasses or liquids. For example, the sheath may be constructed of polyethylene (PE), EFEP or Nylon.

Figure 3:
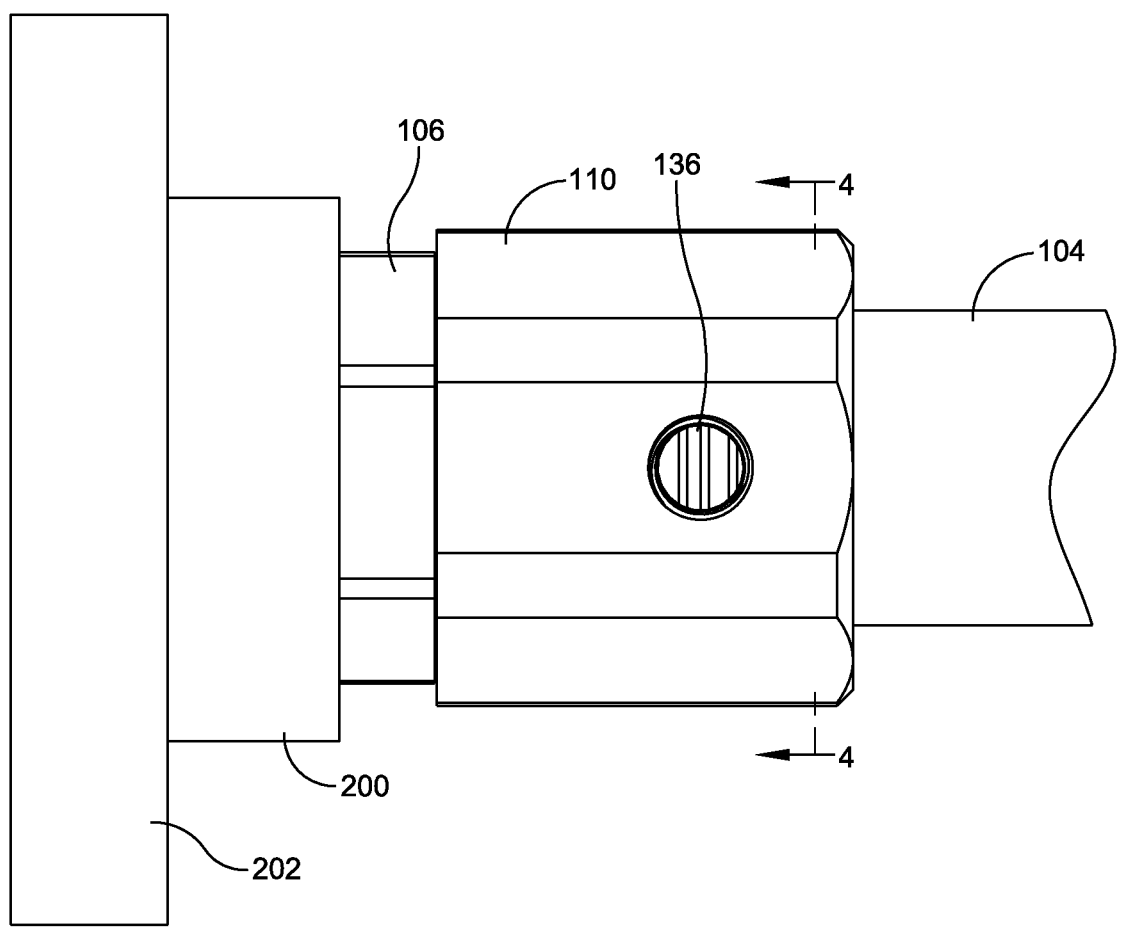
FIG. 3 is an external side elevation view of the fitting, tubing, and sheath of FIG. 1 and including a generally illustrated complementary termination such as an appliance connection.

It should be understood that the fitting 100, tubing 102, and sheath 104 shown in FIG. 1 can form only a portion of a gas or liquid passageway. The remainder of the gas or liquid passageway could comprise an additional fitting coupling to a further length of tubing. Additionally or alternatively, the gas or liquid passageway can include a threaded fitting or nipple configured to couple to an appliance or to a gas supply pipe as shown in FIG. 3.

In the illustrated embodiment, the fitting 100 includes an end plug 106, an engagement ring 108, and a nut 110. In the stripped portion 102a, the tubing 102 is bare to be engaged by the fitting 100. In embodiments in which tubing 102 is corrugated tubing, the engagement ring 108 and/or the end plug 106 can engage the corrugations at the end of the tubing 102, or at least the endmost corrugation, and compress the corrugation(s) to achieve a hermetic seal between the tubing 102 and the fitting 100 as a whole. There are a number of specific ways in which the hermetic seal can be achieved, for example as disclosed in U.S. Pat. Nos. 7,055,868 and 6,877,781, which are incorporated herein by reference.

Figure 2:
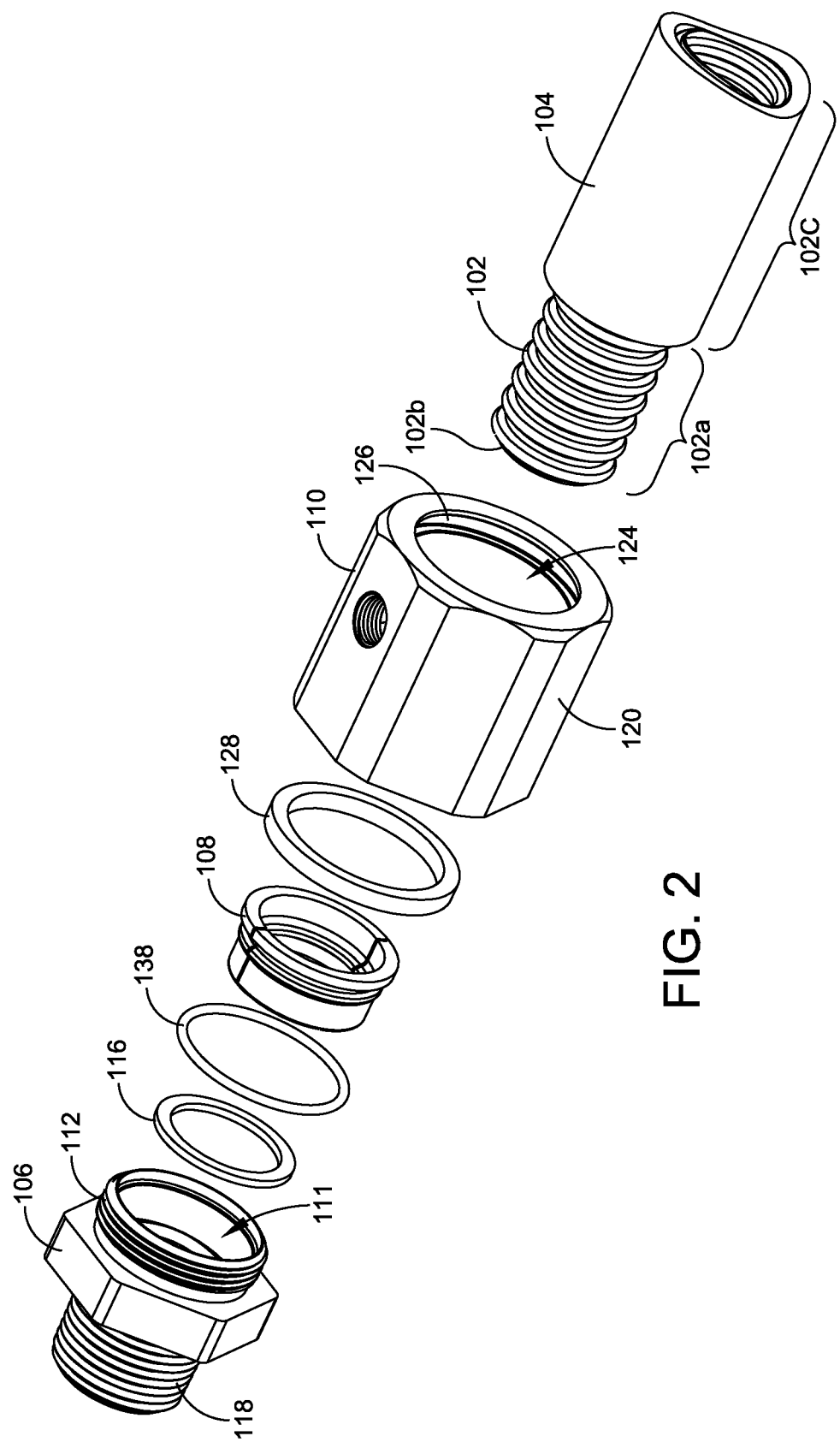
FIG. 2 is an isometric exploded view of the fitting, tubing, and sheath of FIG. 1.

As shown in FIG. 2, the end plug 106 includes a hollow cylindrical part 111 sized to admit and engage with the engagement ring 108. In addition, the end plug 106 includes at least one threaded surface 112. The end plug 106 can also include a recess 114 sized and configured to receive a tubing gasket 116, as shown in FIG. 1. The tubing gasket 116 is configured to engage a portion of the tubing 102 to provide a hermetic seal, as will described further herein. The end plug 106 can also have a second threaded surface 118 which can be used to connect the fitting 100 to a further portion of the gas or liquid passageway.

Figure 5:
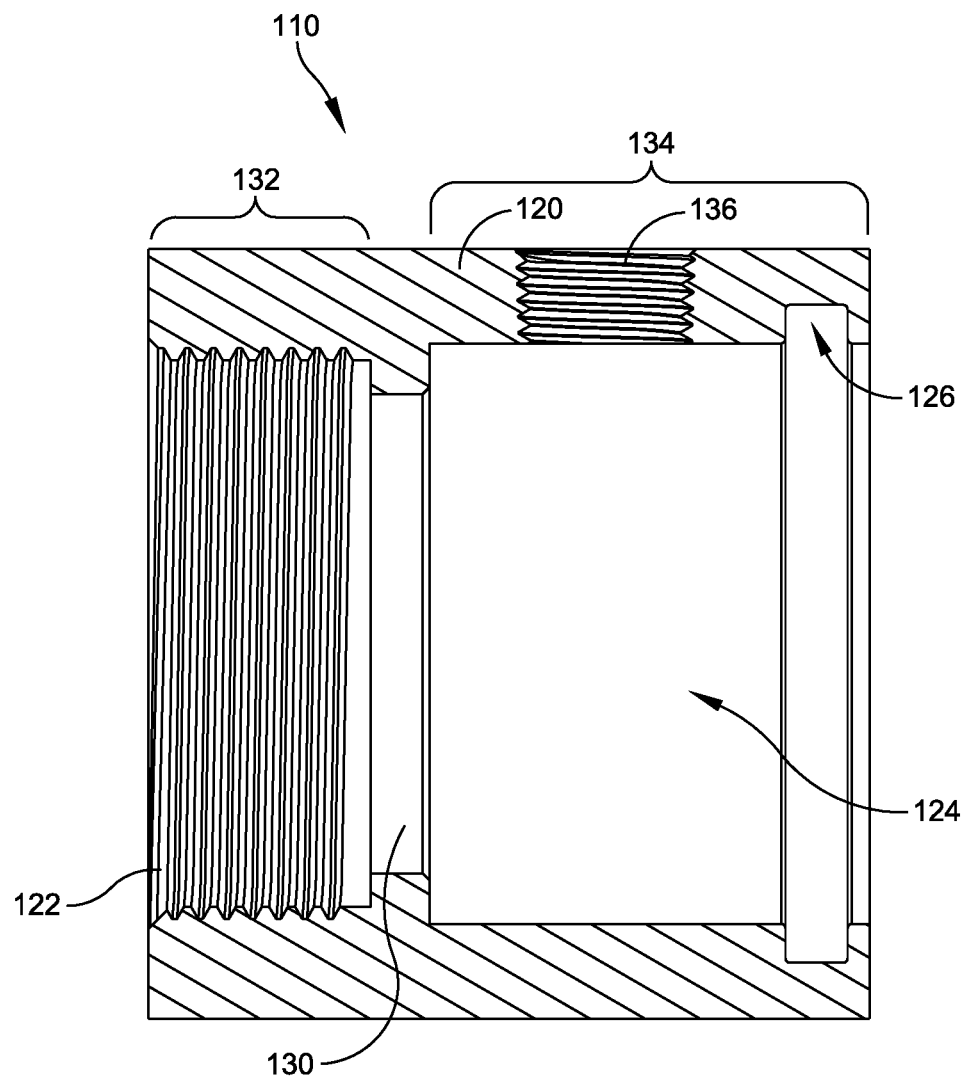
FIG. 5 is a cross-sectional view of a nut according to one aspect of the present disclosure.

As best seen in FIG. 5, the nut 110 has a sidewall 120 with a faceted, hexagonal outer surface which allows for engagement with, a spanner wrench for tightening. The sidewall 120 of the nut 110 includes a threaded portion 122 which is complementary to the threaded surface 112 of the end plug 106 and configured to engage therewith as will be described herein. The inner surface of the sidewall 120 defines an inner cavity 124 of the nut 110. Additionally, an annular groove 126 is defined in the sidewall 120. A sheath gasket 128 is disposed in the annular groove 126 and extends into the inner cavity 124 as will be described further herein. The nut 110 can further include an annular ring 130 extending into the inner cavity 124 and separating the nut 110 into a first portion 132 and a second portion 134. The first portion 132 includes the threaded portion 122 and the second portion 134 includes the annular groove 126. The second portion 134 can be in the form of a cylindrical skirt forming a cylindrical inner cavity 124. The nut 110 further defines a vent 136 through the sidewall 120. In at least one embodiment, the nut 110 is an integral structure. In such embodiments, the nut 110 can be formed of a unitary component, for example by metal casting, injection molding, additive manufacturing (e.g., 3-D printing), machining, or other appropriate process. An integral nut 110 can also be formed by fixedly attaching multiple components to one another, for example by welding or other appropriate procedure.

The sheath gasket 128 can be formed of any material that is able to form a seal between the nut 110 and the sheath 104. In one embodiment, the sheath gasket 128 is constructed of an elastomeric material, such as EPDM rubber. In one embodiment, the sheath gasket 128 can be an O-ring sized to contact both the nut 110 and the sheath 104 when the tubing 102 and sheath 104 are disposed in the fitting 100. In some embodiments, the inner surface of the nut 110 defines more than one annular groove and a sheath gasket is disposed in each and configured to engage the sleeve. Such embodiments may provide redundancy in the event that one sheath gasket is damaged, worn, or ineffective.

Returning to FIG. 1, when assembled and engaged with tubing 102, a first end of the engagement ring 108 abuts, or is adjacent to, the annular ring 130 of the nut 110. An opposite end of the engagement ring 108 abuts, or is adjacent to, the end plug 106 and/or tubing gasket 116. The engagement ring 108 has annular ridges 114a that correspond to the valleys of the corrugations. As the nut 110 is rotated with respect to the end plug 106, and advances in the distal direction (axially), the engagement ring 108 is compressed radially inwardly to grasp the corrugations (i.e., peaks and valleys) of the tubing 102. In addition, the distal end 102b of the tubing 102 is forced against the tubing gasket 116. As a result, the end plug 106 and the nut 110 pinch the tubing 102 and obtain a gas-tight seal. This engagement also prevents axial displacement of the tubing 102 with respect to the fitting 100. In addition, an O-ring 138 or other sealing element can be positioned between end plug 106 and nut 110 to provide additional sealing and prevent inadvertent relative rotation of these components.

The unsheathed portion 102a of the tubing 102 extends longitudinally beyond the sheath 104 enveloping the tubing 102. Thus, when the endmost corrugations of the tubing 102 are hermetically sealed by the fitting 100, there is an annular gap between the tubing 102 and the inside of the nut 110. This annular gap communicates with the vent 136, shown as a threaded opening in the nut 110. The vent 136 is located in the second portion 134 of nut 110.

The second portion 134 of the nut 110 also includes the annular groove 126 in which the sheath gasket 128 resides and bears radially between the nut 110 and the outside of the sheath 104, achieving a seal. To achieve such a seal, the natural inner diameter of the sheath gasket 128 may be less than the outer diameter of the sheath 104. Hence, the sheath gasket 128 fully engages the sheath 104 around its circumference. This seal prevents any uncontrolled leaking of the contents of the tubing 102. For example, if the tubing 102 should be damaged at some point along its proximal length 102c (e.g., between two fittings), for example due to crushing or undue bending of the tubing 102, the sheath 104 will confine any gas or other material leaking from inside the tubing 102 to the zone within the sheath 104. Any gas leakage between the tubing 102 and the sheath 104 is confined and contained within the sheath 104 by the sheath gasket 128. As a result, the leakage is not able to escape from the sheath 104 in the area between the sheath gaskets of two fittings. Hence, the sheath 104 prevents leakage in the areas between end fittings.

In addition, within the fitting 100, a sealed annular volume is formed between the tubing 102 and inner surface of the nut 110, with contents only being able to exit through the vent 136. Any breakage or damage of the stripped portion 102a of the tubing 102 which allows gas to escape from the tubing 102 is confined at one end by the hermetic seal between the distal end 102b of the tubing 102 and the tubing gasket 116. The gas is further confined by the seal between the sheath gasket 128 and the sheath 104. Hence, any leaking gas or pressure is directed to the vent 136. The vent 136 can couple to a leak detection pressure sensor (not shown) or in appropriate instances can couple to a venting conduit that conveys the gas to a safe point of discharge.

FIG. 3 is a side elevation view that additionally illustrates coupling of the fitting 100 to a complementary termination 200, for example the supply coupling to an appliance 202.

Figure 4:
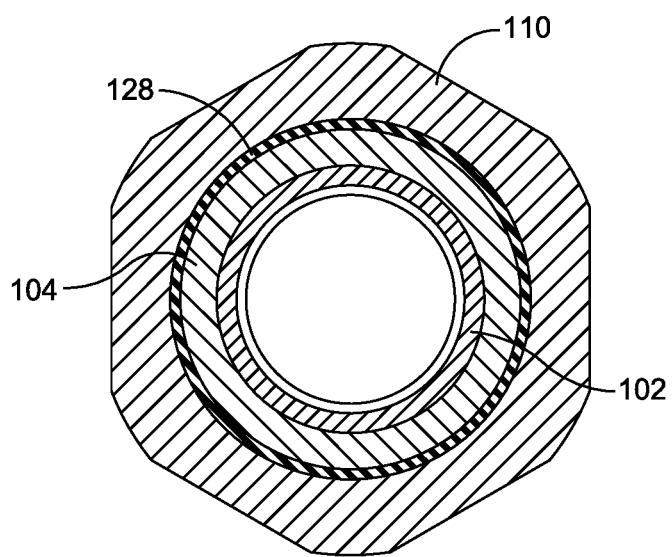
FIG. 4 is a cross section along line 4-4 through the fitting nut shown in FIG. 3.

FIG. 4 is a section along lines 4-4 and shows the sealing engagement between the sheath gasket 128, the nut 110, and the sheath 104. The sheath gasket 128 bears radially inwardly against the outside of the sheath 104 to provide a sealing engagement, as described above. This arrangement confines any leakage between the tubing 102 and the sheath 104 to the volume inside the nut 110 and directs contents to the vent 136.

The benefits of containing any leakage between the tubing 102 and its sheath 104 are achieved in a direct and efficient manner, by extending the usual structure of the nut 110 of the fitting 100 for a distance in the proximal direction, back from the end of the terminal end, and sealing the inside of the extended nut 110 using a sheath gasket 128 in an annular groove 126. The outer surface of the nut 110 can have the usual hexagonal or similar cross section as shown in FIG. 4, enabling the assembler to apply a spanner wrench when tightening the corrugation clamping mechanism.

In other embodiments, a method for terminating a length of corrugated tubing with an outer sheath are provided. The method includes the step of cutting the tubing, thereby forming an endmost corrugation. The method also includes the step of cutting the sheath, thereby exposing a portion of the tubing. The tubing is then inserted into an engagement ring having a ridge placed axially adjacent to the endmost corrugation of the tubing. A threaded portion of a nut is then engaged with a threaded surface of an end plug to cause the ridge to securely grip the tubing. Additionally, a gasket disposed in an annular groove of the nut sealingly engages the sheath.

The fittings described herein are effective and not unduly expensive. The components are small and compact and require less assembly time. Because the nut houses the gasket that engages the sheath, extra components are not required to form a sealed volume. That leakage may be contained at the end of the tubing and sheathing or vented appropriately to the open air is particularly advantageous in sections of underground tubing installations.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A fitting for an end of a length of corrugated tubing with an outer sheath, the fitting comprising:
    an engagement ring for gripping the tubing adjacent to an endmost corrugation of the tubing so as to preclude axial displacement of the engagement ring on the tubing;
    an end plug having a hollow cylindrical part sized to admit and engage with the engagement ring, the end plug having at least one threaded surface, including a threaded external surface;
    a nut having a threaded internal surface complementary with the threaded external surface of the end plug, the nut further having a sidewall with an inner surface defining an inner cavity and an annular groove extending from the inner surface and a vent extending through the sidewall and disposed between the threaded surface and the annular groove; and
    a gasket disposed in the annular groove, wherein a portion of the gasket extends into the inner cavity and is configured to sealingly engage the outer sheath.

2. The fitting of claim 1, wherein the gasket comprises an elastomeric material.

3. The fitting of claim 2, wherein the gasket is an o-ring.

4. The fitting of claim 1, wherein the nut is an integral structure.

5. The fitting of claim 1, wherein the nut further includes an inwardly-projecting annular ring adjacent to and configured to abut an end of the engagement ring.

6. The fitting of claim 5, wherein the annular ring divides a first portion of the nut from a second portion, and wherein the threaded internal surface is on the first portion and the annular groove is on the second portion.

7. The fitting of claim 1, wherein the fitting is configured to sealingly engage the corrugated tubing to form a sealed annular volume whereby a potential leakage path between the corrugated tubing and the sheath is confined to emit at the vent.

8. A fitting-tubing assembly comprising:
    tubing having peaks and valleys and an outer sheath; and
    a fitting secured to the tubing, the fitting comprising:
        an engagement ring for gripping the tubing axially adjacent to an endmost corrugation of the tubing so as to preclude axial displacement of the engagement ring on the tubing;
        an end plug having a hollow cylindrical part sized to admit and engage with the engagement ring, the end plug having at least one threaded surface, including a threaded external surface;
        a nut having a threaded internal surface complementary with the threaded external surface of the end plug, the nut having a sidewall with an inner surface defining an inner cavity and an annular groove extending from the inner surface and a vent extending through the sidewall and disposed between the threaded surface and the annular groove; and
        a gasket disposed in the annular groove, wherein a portion of the gasket extends into the inner cavity and sealingly engages the outer sheath.

9. The fitting-tubing assembly of claim 8, wherein the gasket comprises an elastomeric material.

10. The fitting-tubing assembly of claim 9, wherein the gasket is an o-ring.

11. The fitting-tubing assembly of claim 8, wherein the nut is an integral structure.

12. The fitting-tubing assembly of claim 8, wherein the nut further includes an inwardly-projecting annular ring adjacent to and configured to abut an end of the engagement ring.

13. The fitting-tubing assembly of claim 12, wherein the annular ring divides a first portion of the nut from a second portion, and wherein the threaded internal surface is on the first portion and the annular groove is on the second portion.

14. The fitting-tubing assembly of claim 8, wherein the fitting is sealingly engaged with the corrugated tubing to form a sealed annular volume whereby a potential leakage path between the corrugated tubing and the sheath is confined to emit at the vent.

* * * * *